United States Patent Office 2,904,437
Patented Sept. 15, 1959

2,904,437

TREATING WHEY

Edward J. Czarnetzky, Palos Heights, Ill., assignor to Wilson & Co., Inc., a corporation of Delaware No Drawing. Application June 1, 1954
Serial No. 433,821

3 Claims. (Cl. 99—9)

This invention relates to an improved food product for ruminant animals by ammoniation of carbohydrate containing animal foods usually waste residues suitable for cattle food, such as whey. More particularly, the invention is directed to ammoniation methods and improved ammoniated food products which naturally contain carbohydrates such as sugar, lactose, glucose, starch, capable of being oxidized by fermentation, enzymatic oxidation or both to convert the carbohydrate into readily ingestible organic acids of carbohydrate type like lactic, gluconic or similar organic acids, etc., whereby upon subsequent ammoniation greater quantities of ammonia are chemically bonded as the ammonium salt of the lactic acid, gluconic acid or their edible organic acid equivalents which the ruminant, in its digestive processes, can convert to protein or its metabolic equivalent.

Whey, a by-product of the cheese industry, has constituted a serious disposal problem for many years. It may be condensed to about 30 to 80% solids and used as a food for ruminant animals. The present invention greatly enhances the efficiency thereof as a food for cattle or sheep.

Other food products, such as are naturally low in protein and most economically are of a waste or by-product character, can have their carbohydrate content oxidized to increase edible acid content and then ammoniated. The ammonia is stably bonded chemically as the salt, thereby forming the same into a more readily protein convertible, more palatable, and body assimilable form of the nitrogen as a ruminant animal food, and in far greater protein equivalent quantities. Thus, waste by-product pulps of the beet sugar or citrus industries, sugar residues like molasses or even high carbohydrate feeds which are not waste, such as ceretal grains, corn, oats, etc., may have their equivalent protein content increased for ruminant animal feeding according to the present method.

In the prior art, while ammoniation of certain waste products such as molasses or sugar beet pulp has been proposed, such efforts were directed to incorporating the ammonia by direct solution or absorption in an aqueous phase carrier of the food solids. While such food solids may contain traces of naturally present organic acids capable of salt formation with some of ammonia, these have been present in such minor proportion that little ammonia became fixed in that form. Rather, the prior art efforts were directed to use of pressure to incorporate the ammonia either to increase the quantity dissolved in the liquid or increase the quantity of the ammonia absorbed in the food solids. Such excess ammonia was substantially free, and not chemically fixed, either in the soluble or insoluble phases, as a chemically bonded salt, and as such could be used only in incontrollably small quantities, to avoid rendering the food so highly pungent as to be unpalatable to the cattle.

According to the present invention, a carbohydrate containing food product preferably a waste product such as whey is subjected to a biochemical oxidation, such as by fermentation, enzymatic oxidation, or both, to convert a substantial portion of the oxidizable carbohydrate substance thereof, such as lactose in the instance of whey, or other carbohydrates such as sugar, glucose, starch in the instance of other food bases. This biochemical oxidation converts the carbohydrate in part to organic acids like lactic acid, gluconic acid, etc., which are equally as digestible as the carbohydrate. The food base product, so oxidized, now contains a substantially increased quantity of organic acids capable of chemically reacting with and binding ammonia in the form of the salts of such acids. As relatively stable salts, the fixed nitrogen content, and thereby its metabolic protein equivalent of the food, is greatly increased, and the fixed nitrogen, essentially present as the ammonium salt, is in a better form in the food. At the same time, while the carbohydrate is converted to a form capable of bonding the ammonia, the food value of the carbohydrate as such is retained.

In practicing the present invention, a food product, preferably a waste product such as whey, is subjected to a biochemical oxidation such as a simple fermentation on enzymatic oxidation to convert a substantial portion of its carbohydrate, essentially lactose, to an organic acid which by fermentation is essentially lactic acid. The whey may then be ammoniated to neutralize the lactic acid, thereby forming a stable salt, ammonium lactate, as well as adjusting the ammonia content to optimum palatability and the protein equivalent of the food to a desired value. It is preferred first to ferment the whey in its natural dilute form for optimum economy, using only enough ammonia during the fermentation to adjust the pH for optimum fermentation conditions; then to concentrate the lactic acid containing fermented whey to a desirable commercial concentration of about 30 to 80% solids preferably 40 to 60% solids, and finally to ammoniate the concentrate.

Thus in the case of whey normally containing total solids of about 6.5% and mere traces of lactic acid, if any, fermentation under normal conditions with a typical lactic acid-forming microorganism such as *L. bulgaricus* will convert much of the lactose content to about 2% of lactic acid. The whey is then concentrated and then ammoniated.

The biochemical oxidation may be accompanied by formation of enzymes which in themselves effect the oxidation during the fermentation process which may take place in air and/or in the presence of an oxidizing agent such as hydrogen peroxide. It is possible for various foods as mentioned above to effect the oxidation by direct enzyme action of an oxidase which in the presence of oxygen catalytically converts a carbohydrate substrate in the food to an organic acid such as gluconic acid which may subsequently be ammoniated. For example, where the food product contains such carbohydrates as glucose, mannose, or galactose, as substrate, a typical glucose oxidase, preferably used in conjunction with catalase, will enzymatically oxidize the same in the presence of oxygen to gluconic acid. Where the carbohydrate is in polysaccharide form such as starch, maltose, sucrose, or lactose, the enzymes diastase, maltase, invertase, or lactase, respectively, will be used additionally to the oxidase to first convert the polysaccharide to glucose and then by the enzymatic oxidation of the glucose oxidase, the glucose will be converted to gluconic acid. Thus the proper enzyme combination as known in the art will be used depending upon the substrate available in the food product to be oxidized to enzymatically convert a substantial portion of its substrate to gluconic acid or similar carbohydrate acid available for subsequent ammoniation to its salt.

Such enzymes are usually available from bacteria culture as known in the art. For example, a culture of *Penicillium chrysogenum* cultured in a typical nutrient medium, the cultured mold being ground and dialyzed, produces in the filtrate the enzyme glucose oxidase. Other Penicillium may be used and other molds such as the *Aspergillus* (*fumaricus* or *niger*) are suitable. For example, for converting the lactose of whey enzymatically to glucose, the enzyme lactase in combination with glucose oxidase would then convert the milk sugar lactose to gluconic acid. Either biochemical oxidation method may be used, but I prefer simple fermentation of whey to produce lactic acid therein.

EXAMPLE 1

Fermentation (a) *Preparation of inoculant culture.*—A quart of sterile skim milk is inoculated with a culture containing *L. bulgaricus* plus a mycoderm (American type culture collection #9223). The culture is incubated for 24 hours at 110° F. and then transferred to a jug containing 40 quarts of pasteurized skim milk which is again incubated for 24 hours at this temperature. The 40 quart culture is then added to a 500 gal. glass lined tank of pasteurized whey and again incubated for 24 hours at 110° F.

(b) *Fermentation.*—The 500 gal. starting culture prepared above is suitable for inoculation of 5,000 gals. of whey. It is introduced into the 5,000 gals. in a wooden vat in the bottom of which is distributed a manifold of perforated brass pipe for introduction of steam. A second manifold of stainless steel pipe is mounted in the bottom similarly perforated for introduction of ammonia gas. The tank is further equipped with a mechanical stirrer. The 5,000 gal. lot of whey is pumped into the tank and heated by introducing steam to 110° F. The inoculating 500 gal. culture is added with stirring while maintaining the temperature constant. The pH of the ferment is determined at 4 hour intervals and adjusted to the range of 5.8 to 6.0 by adding sufficient ammonia gas as needed. The fermentation is allowed to continue for about 36 hours (but it may be longer) until the lactose content by analysis is found to be below about 1.2%. Thereafter, the fermented liquor is pumped to a vacuum pan and concentrated from an original of about 6.5% total solids to about 50% total solids. At this stage analysis indicates that 15% of the solids are lactic acid. As the concentration proceeds, ammonia gases evolved may be recycled for use in pH control of another fermenting batch.

(c) *Neutralization.*—The condensed liquor from the vacuum pan reduced by evaporation to a volume of about 750 gals. is discharged to a neutralization tank. This tank is tall and narrow in cross section to confine the liquid into a tall column. The column of liquid should be about 8 feet high and the ammonia is introduced through the perforated steel pipe in the bottom at a rate while stirring such that it will be absorbed and reacted with the lactic acid as fast as introduced by the tall column of liquid. The tank may have a cover and outlet pipe through which excess ammonia may be recycled to a fermenting batch for pH control as above. Samples of the ammoniated liquor are collected from the top, center and bottom of the column, homogeneously mixed in equal proportions, and the pH determined. When a composite pH in the range of about 7 to 8 is reached introduction of further ammonia is terminated and any excess ammonia in the air space above the tank is flushed off with air. The completed whey product may be passed into tank cars or packaged in metal drums or other containers for liquid.

(d) *Yield.*—The composition of the original 5,000 gals. of cheese or casein whey prior to fermentation has the following analysis:

| Material: | Lb. |
|---|---|
| Protein | 375 |
| Fat | 104 |
| Lactose | 2,000 |
| Lactic acid | 83 |
| Ash | 208 |
| Solids | 2,770 |
| Water | 39,000 |
| Total | 41,770 |

The composition of the final product:

| Material: | Lb. |
|---|---|
| Protein | 375 |
| Fat | 104 |
| Lactose | 500 |
| Ammonium lactate | 1,623 |
| Ash | 208 |
| Solids | 2,810 |
| Water | 2,810 |
| Total | 5,620 |

Analysis of final product:

| | Percent |
|---|---|
| Actual protein | 6.7 |
| Ammonium lactate calc. as protein | 23.7 |
| Total protein equivalent | 30.4 |
| N.F.E. | 35.0 |
| Ash | 3.7 |
| Water | 50.0 |

It will be noted that during the fermentation the lactose content decreases about 75% from 2,000 to 500 lbs. in the batch. Lactic acid increases from an original of 83 lbs., about .3% of the total solids, to 1363 lbs., about 50% of the total solids, which binds about 260 lbs. of ammonia for neutralization to form 1623 lbs. of ammonium lactate in the final composition which amounts to about 56% of the total solids in the concentrate. A preferred concentration of ammonium lactate calculated as protein is in the range of 15 to 30%. A concentration as low as 8% is acceptable as protein content in a feed. The proportions therefore of the feed may be varied to give a desired protein content of the whey by concentration, dilution and blending with other food products. Of course, the water content may further vary from 20 to 70% as desired in the final product so that the solids will vary from 30 to 80%.

It will be noted that this fermentation procedure modifies the carbohydrate content to a form wherein large quantities of ammonia may be chemically bonded as the ammonium salt, but does not destroy the content of the carbohydrate in the feed which is still available in the lactic acid residue to which the lactose was converted.

According to the example given above, the fermentation procedure results in an 85% yield to effect conversion of lactose to lactic acid and is quite economical to produce a feed for ruminants such as cattle, sheep and the like, of controllably high equivalent protein content in the range of 8 to 30% by ammoniation, the ammonia being present in a form readily assimilable as protein, and without adversely affecting the stability and palatability of the food product ammoniated. While a specific microorganism *L. bulgaricus* was used in the foregoing example, equivalent fermentations to produce lactic acid using other microorganisms known in the fermentation art may be substituted.

Various carbohydrate containing food products may be treated by biochemically oxidizing the carbohydrate content to an organic acid such as lactic or gluconic acids, equally useful as carbohydrate food products, and then ammoniating the oxidized material to chemically bond the ammonia in the form of the ammonium salts of these acids. The invention uses a controlled fermentation by microorganisms during fermentation as a preferred procedure. Such fermentation is outstandingly useful for conversion of a normally waste product, whey, to a desirable high protein-containing feed in which the lactose of the whey is converted to lactic acid, readily ammoniated to ammonium lactate as a high protein containing cattle food.

In an alternate procedure, culture of the microorganism may be run independently of the food product to be marketed, for purposes of producing a desirable enzyme capable of converting a carbohydrate substrate to glucose, which, by further enzymatic oxidation with glucose oxidase, preferably in the presence of catalase, may be converted to gluconic acid which may be similarly ammoniated.

I claim:

1. The method of treating whey to increase its protein equivalent nitrogen content to make it suitable for use as a feed for ruminant animals comprising biochemically oxidizing whey while maintaining the pH in the range of 5.8–6 by addition of ammonia, to convert the lactose to organic carbohydrate acid, concentrating the oxidized material and neutralizing the acid content of the concentrated material to a pH in the range between about 7 and 8 with ammonia to produce fixed ammonia in the form of a salt and a protein equivalent content of said whey product varying from about 8% to about 30%.

2. The method of treating whey to increase its protein equivalent nitrogen content to make it suitable for use as a food for ruminant animals comprising fermenting whey while maintaining the pH in the range of 5.8 to 6 by addition of ammonia, to convert a substantial portion of the lactose to lactic acid, concentrating the fermented whey and neutralizing the acid content to a pH in the range between about 7 and 8 with ammonia to produce fixed ammonia in the form of ammonium lactate and a protein equivalent content of said whey product varying from about 8% to about 30%.

3. The method of treating whey to increase its protein equivalent nitrogen content to make it suitable for use as a feed for ruminant animals comprising biochemically treating the whey with a lactase and a glucose oxidase to convert lactose in the whey to glucose and a substantial portion of the glucose to gluconic acid while maintaining the pH in the range of 5.8 to 6 by addition of ammonia, concentrating the fermented whey and neutralizing the acid content to a pH in the range between about 7 and 8 with ammonia to produce fixed ammonia in the form of ammonium salt and a protein equivalent content of said whey product varying from about 8% to about 30%.

References Cited in the file of this patent

UNITED STATES PATENTS

| | | |
|---|---|---|
| 2,465,905 | Mead et al. | Mar. 29, 1949 |
| 2,567,257 | Voss | Sept. 11, 1951 |
| 2,603,567 | Stiles | July 15, 1952 |
| 2,755,187 | Belasco | July 17, 1956 |